US012811941B2

(12) United States Patent
Brecl et al.

(10) Patent No.: US 12,811,941 B2
(45) Date of Patent: Nov. 24, 2026

(54) NETWORK BASED BLOCKING THREAT INTELLIGENCE SYSTEM AND METHODS

(71) Applicant: Level 3 Communications, LLC, Broomfield, CO (US)

(72) Inventors: Peter Brecl, Highlands Ranch, CO (US); Mark Dehus, Thornton, CO (US)

(73) Assignee: Level 3 Communications, LLC, Denver, CO (US)

( * ) Notice: Subject to any disclaimer, the term of this patent is extended or adjusted under 35 U.S.C. 154(b) by 361 days.

(21) Appl. No.: 18/425,430

(22) Filed: Jan. 29, 2024

(65) Prior Publication Data

US 2025/0141871 A1 May 1, 2025

Related U.S. Application Data

(60) Provisional application No. 63/593,812, filed on Oct. 27, 2023.

(51) Int. Cl.
*H04L 9/40* (2022.01)

(52) U.S. Cl.
CPC .................................. *H04L 63/101* (2013.01)

(58) Field of Classification Search
None
See application file for complete search history.

(56) References Cited

U.S. PATENT DOCUMENTS

| | | | | |
|---|---|---|---|---|
| 6,377,577 | B1 * | 4/2002 | Bechtolsheim | H04L 45/7453 370/395.32 |
| 7,188,164 | B1 * | 3/2007 | Etheridge | H04L 63/101 709/225 |
| 2009/0119750 | A1 | 5/2009 | Sembugamoorthy | |
| 2014/0379915 | A1 * | 12/2014 | Yang | H04L 63/101 709/225 |
| 2020/0236132 | A1 | 7/2020 | Reddy | |
| 2021/0067490 | A1 | 3/2021 | Nishijima | |
| 2021/0359997 | A1 * | 11/2021 | Ranjan | G06F 13/4022 |

OTHER PUBLICATIONS

International Search Report and Written Opinion of the International Searching Authority, dated Apr. 22, 2024, Int'l Appl. No. PCT/US2024/013308, Int'l Filing Date Jan. 29, 2024; 11 pgs.

* cited by examiner

*Primary Examiner* — Farid Homayounmehr
*Assistant Examiner* — Suman Debnath

(57) ABSTRACT

The present application describes systems and methods for network-based blocking threat intelligence. An access control list (ACL) generator may modify ACLs and provide modified ACLs to provider edge routers based on the capabilities of the provider edge routers. In some cases, an additional provider edge router that is more capable of implementing longer ACLs may be used. In some cases, a collector may identify when threat communications are bypassing provider edge routers with limited ACL lengths and provide the customer an opportunity to buy a better router or access to an additional router that supports longer or additional ACLs. A threat intelligence system may update (e.g., continuously update) the ACL provided to the ACL generator, and the ACL generator may accordingly update the modified ACLs provided to the provider edge routers.

11 Claims, 6 Drawing Sheets

NETWORK BASED BLOCKING THREAT INTELLIGENCE SYSTEM AND METHODS

CROSS-REFERENCE TO RELATED APPLICATIONS

This application claims the benefit of U.S. Provisional Application No. 63/593,812 filed Oct. 27, 2023, entitled "Network Based Blocking Threat Intelligence System and Methods," which is incorporated herein by reference in its entirety.

BACKGROUND

Access control lists (ACLs) are a security concept in computer networking and operating systems. They serve as a centralized or distributed list of permissions that dictate who or what is authorized to access, modify, or execute a given resource.

In networking, routers use ACLs to control network traffic, acting like a filter that decides which packets are allowed, rate limited, or denied based on specified conditions such as source or destination IP address, port number, or protocol type. ACLs in routers prevent unauthorized access and secure the network from potential attacks. It is with respect to this general technical environment that aspects of the present application are directed.

SUMMARY

The present application describes systems and methods for network-based blocking threat intelligence.

For example, aspects of the present application include a method comprising: receiving an access control list; determining a capability of a first router; modifying the access control list based at least in part on the capability of the first router; and providing the modified access control list to the first router.

In some examples, modifying the access control list comprises reducing a number of items on the access control list based at least in part on identifying a maximum capacity of the first router for the access control list. In some examples, the capability of the first router is based at least in part on an identifier of the first router, one or more other access control lists stored on the first router, or a combination thereof. In some examples, the method further comprises: receiving an update to the access control list; and updating the modified access control list of the first router based at least in part on the update to the access control list. In some examples, the method further comprises: determining that the first router has received at least a threshold number of threat communications associated with identifiers in the access control list and not in the modified access control list; and reporting a warning communication based at least in part on determining that the first router has received at least the threshold number of threat communications associated with identifiers in the access control list and not in the modified access control list. In some examples, the method further comprises: determining a remainder of the access control list, the remainder comprising identifiers on the access control list but not on the modified access control list; and providing the remainder of the access control list to a second router, wherein the second router is upstream from the first router. In some examples, the modified access control list comprises intra-network identifiers and the remainder of the access control list comprises inter-network identifiers. In some examples, the first router is configured to block an incoming communication based at least in part on the incoming communication comprising an identifier that is listed on the modified access control list. In some examples, the first router is configured to block an outgoing communication based at least in part on the outgoing communication comprising an identifier that is listed on the modified access control list.

In another example, aspects of the present application include a method comprising: determining a first access control list; determining a second access control list that is a subset of the first access control list; implementing the second access control list at a first router; determining that the first router has received at least a threshold number of threat communications associated with identifiers in the first access control list and not in the second access control list; and taking a mitigation action based at least in part on determining that the first router has received at least the threshold number of threat communications associated with identifiers in the first access control list and not in the second access control list.

In some examples, taking the mitigation action comprises reporting a warning communication. In some examples, the warning communication comprises an option to upgrade a security setting. In some examples, the warning communication comprises an option to remove one or more lowest risk score identifiers from the second access control list and add, to the second access control list, the identifiers associated with the received threat communications in the first access control list and not in the second access control list. In some examples, the method further comprises: implementing a third access control list at a second router, the third access control list comprising a difference between the first access control list and the second access control list. In some examples, implementing the second access control list at the first router is based at least in part on a capability of the first router. In some examples, the identifiers comprise internet protocol addresses, port numbers, protocol types, or a combination thereof.

In another example, aspects of the present application include a system comprising at least one processor; and a memory operatively connected to the at least one processor and storing instructions that, when executed by the at least one processor, cause the system to perform a method. In some examples, the method comprises: receiving an access control list; determining a capability of a router; modifying the access control list based at least in part on the capability of the router; and providing the modified access control list to the router.

In some examples, modifying the access control list comprises reducing a number of items on the access control list based at least in part on identifying that the first router is not capable of storing the full access control list. In some examples, the method further comprises: receiving an update to the access control list; and updating the modified access control list of the first router based at least in part on the update to the access control list. In some examples, the method further comprises: determining that the first router has received at least a threshold number of threat communications associated with identifiers in the access control list and not in the modified access control list; and causing a mitigation action to be performed based at least in part on determining that the first router has received at least the threshold number of threat communications associated with identifiers in the access control list and not in the modified access control list. In some examples, the method further comprises: determining a remainder of the access control list, the remainder comprising identifiers on the access control list but not on the modified access control list; and providing the remainder of the access control list to a second router, wherein the second router is upstream from the first router.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
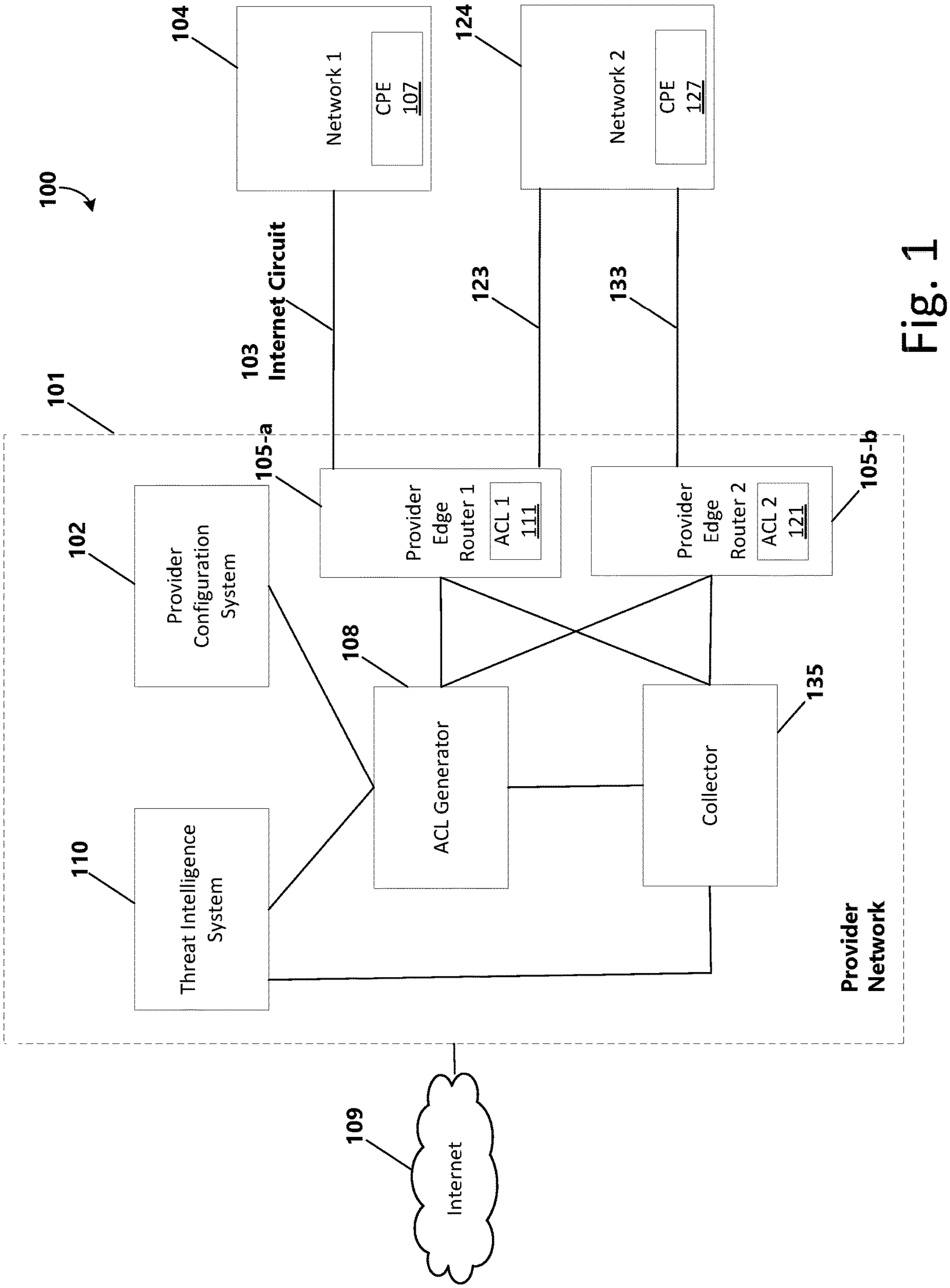
FIG. 1 is a block diagram depicting an example system according to aspects of the present application.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

In examples, one or more access control lists (ACLs) may be used to filter out communications. For example, an ACL may include identifiers such as, for example, IP addresses (e.g., source IP addresses, destination IP addresses, or both), or other identifiers such as port number, protocol type, or the like, corresponding to known threats. So, if a network receives communications from, for example, the Internet, the communications may be filtered through at least a device implementing the ACL (e.g., a router, a physically or virtually network adjacent computing capability with ACL capable software, or otherwise), and communications associated with identifiers in the ACL may be filtered out or prevented from communicating with the network. In some examples, the ACL may comprise a list of identifiers used as a "permit" list, rather than an "exclude" list, so only communications that include an identifier on the ACL are permitted through, and all others are filtered out.

In some examples, however, the ACL(s) may become very long-including, e.g., tens of thousands of entries. Examples herein provide for selectively implementing ACLs on one or more routers on a provider network. Some routers, depending on storage, processing capacity, the number of other ACLs already implemented on the router, or other capability, may be able to handle implementing ACLs of a certain length (e.g., 15,000 items on the ACL), but not more. If a customer of a provider network desires, the ACL(s) may be loaded onto provider edge routers (e.g., without hardware modifications) provided that the routers are capable of handling the ACLs based on their capability. In some examples, the provider edge routers may not be capable of implementing an entire ACL. For example, some routers are only able to implement an ACL of a certain length. In examples, such routers may be configured to implement a first portion of an ACL, and the remainder of the ACL may be implemented on a higher-level or an upstream router that may be capable of implementing the rest of the ACL. In examples, such features may be selected by the customer of the provider network.

In examples, a full (or "master") ACL may be maintained or provided, such as by one or more threat intelligence systems. In examples, the ACL, or portion thereof, implemented by each participating router may be updated (e.g., continuously or periodically) from one or more threat intelligence system or by other systems, including through a user interface. In some examples, if only a truncated version of the full ACL is implemented on a router, a collector may log and/or report when a communication gets through that would have otherwise been filtered out had the full ACL been implemented on the router. The collector, or some other module on the provider network, may cause a mitigation action to be performed. For example, a warning communication may be provided to the customer and/or the provider network indicating that the customer is not being protected from such threat communications. In another example, the mitigation action may include automatically or programmatically installing a larger ACL on a different router 105 (e.g., 105-*b*) where traffic may be automatically routed to the different router 105 (e.g., 105-*b*) instead of the first router 105 (e.g., provider edge router 105-*a*). Additionally or alternatively, an additional part of the original ACL may be automatically or programmatically added to an ACL at an upstream router (e.g., router 205), or another router (e.g., the second router 105 (e.g., 105-*b*)). In examples where the ACL comprises a list of identifiers used as a "permit" list, rather than an "exclude" list, the collector may log and/or report when a communication is denied that would have otherwise been permitted had the full ACL been implemented on the router. The customer may then be presented with an opportunity to upgrade to implementing a larger ACL (e.g., by replacing the router with a more capable router, or otherwise implementing a larger ACL. In some examples, truncated ACLs that are relevant for intra-network or intra-customer network communications may be implemented on provider edge routers, while a remainder of the ACLs that are relevant for inter-network communications may be implemented on provider network routers that have greater capacity (e.g., the higher-level router) and/or are positioned to transceive inter-network communications. Such routers implementing ACLs may additionally or alternatively be capable of preventing outgoing communications from the customer network at the ACL-implementing router using the ACL(s).

FIG. 1 depicts an example system 100 according to aspects of the present disclosure. A provider configuration system 102 may be provided by an Internet service provider or other network provider to allow customers to arrange for network connectivity. For example, an Internet circuit 103 may be provided between network 104 (e.g., a customer or customer network, an internal network, an edge environment) and a provider edge router 105 on network 101 to permit customer device(s) 107 operating on or connected to network 104 access to a wide area network, such as the Internet 109. It will be understood that all connections between systems depicted with respect to FIG. 1 can be wired or wireless and may include various intervening devices and systems.

The provider configuration system 102 may provide a customer portal, including a user interface, to allow Internet connectivity to be ordered by, and then provisioned for, a customer. For example, the provider configuration system 102 may be operatively connected to one or more customer device(s) (e.g., through a third-party wired or wireless connection prior to the customer Internet circuit 103 being provisioned). In examples, after the customer Internet circuit 103 is provisioned, the same or different customer device(s) may connect to the Internet 109 through network 104, customer Internet circuit 103, and a provider edge router 105 (e.g., provider edge router 105-*a*, provider edge router 105-*b*). References herein to provider edge router 105 may refer to provider edge router 105-*a*, provider edge router 105-*b*, or both. In examples, the network 104 comprises at least one device referred to as customer premises equipment (CPE) 107. In examples, CPE 107 may comprise a network address translation (NAT) device (or router with NAT capabilities) that assigns Internet protocol (IP) addresses to customer devices on the network 104 and routes messages into and out of network 104.

In some examples, connections between provider edge routers 105 and networks 104, 124 may be virtual connections or interfaces (e.g., as in a network to network interface (NNI)) where each virtual connection is specific to each customer as shown in the lines 103, 123, 133 connecting particular provider edge routers 105 to networks 104, 124 (e.g., through different virtual local area networks (VLANs)), even though the actual internet circuit infrastructure is shared across networks. For example, Internet circuit 103 might be VLAN A, Internet circuit 123 might be VLAN B, and Internet circuit 133 might be VLAN C.

In some examples, the provider network 101 may also provide threat intelligence system(s) 110. Threat intelligence system(s) 110 may provide ACLs to ACL generator 108. Such ACLs may comprise tens of thousands of items (e.g., IP addresses) (e.g., 90,000 items). Threat intelligence system 110 may update (e.g., continuously or periodically update) ACL generator 108 with new or updated ACLs based on updated threat information.

In some examples, the provider network 101 may also provide an ACL generator 108. The ACL generator 108 may aggregate ACLs from multiple sources to maintain one or more full, master ACL(s). ACL generator 108 may also generate modified ACLs for provider edge routers 105. For example, ACL generator may receive an ACL from threat intelligence system 110 and/or aggregate ACLs from multiple sources into one or more full, master ACL, and may modify (e.g., shorten or truncate) the master ACL to a different number of items (e.g., shorten the list from 90,000 items to 15,000 items) based on the capability of the provider edge router 105. For example, some provider edge routers 105 may be incapable of handling any ACL implementation. Some provider edge routers 105 may be capable of handling ACL lengths of 15,000 items or some other maximum length. Capability of routers may be based on aspects related to storage, processing capacity, the number of ACLs already implemented on the provider edge router 105, among other factors. In examples, the ACL generator 108 may receive (e.g., from provider configuration system 102, from provider edge router(s) 105, etc.) information about the capabilities of the provider edge router(s) 105. In some examples, the ACL generator 108 may receive information identifying a particular model or type (e.g., model number, manufacturer, model year, configuration information, software version, etc.) of provider edge router 105 and perform a lookup at an accessible data source that stores the relevant capabilities of the provider edge router 105 based on such identification.

Provider edge router 105-*a* may implement ACL 111, and provider edge router 105-*b* may implement ACL 121. Provider edge router 105-*a* and provider edge router 105-*b* may be capable of handling a similar or same length of ACLs, or different lengths of ACLs, based on a capability of each router. Provider edge routers 105 may block incoming communications (e.g., from Internet 109), outgoing communications (e.g., from network 104), or both, when an identifier on the ACL 111 or ACL 121 matches an identifier from the incoming or outgoing communication (e.g., IP matches). As discussed, in some examples, the ACL may comprise a list of identifiers used as a "permit" list, rather than an "exclude" list, so only communications that include an identifier on the ACL are permitted through, and all others are filtered out.

In some examples, the provider network 101 may also provide a collector (e.g., NetFlow collector) 135. Collector 135 may collect/generate some or all communication records to and/or from provider edge routers 105. For example, there may be traffic from Internet 109 to CPE 127, and collector 135 may generate entries that indicate IP address A communicates with CPE 127, IP address B communicates with CPE 127, etc. Some of these IP addresses may be IP addresses identified as threats by one or more threat intelligence systems 110.

Threat intelligence system 110 may provide one or more ACLs to collector 135 (e.g., that include these IP addresses, or other identifiers of threat communications). In examples, threat intelligence system 110 may provide the ACLs through ACL generator 108 (e.g., ACL generator 108 provides the ACLs to collector 135). Additionally or alternatively, ACL generator may provide complete and/or modified ACLs, such as ACLs that are provided to provider edge routers 105, to collector 135. ACL generator 108 may indicate which provider edge routers 105 implement certain modified ACLs, or provider edge routers 105 may indicate this information directly to collector 135. That is, collector 135 may have knowledge of which provider edge routers 105 are participating in implementing ACLs, and what particular ACLs are being implemented by each participating provider edge router 105.

Collection module 135 may collect/generate records for incoming and/or outgoing communications. For example, the collector 135 may sample (e.g., 1 of 100, 1 of 1,000, etc.) communications transceived by provider edge router(s) 105. In some examples, the sampling (along with a comparison to the relevant ACL(s) for a provider edge router 105) can reveal that some communications are being undesirably permitted or denied by the provider edge router(s) 105. For example, if the provider edge router 105 (e.g., 105-*a*) is implementing a truncated ACL, suspected threat communications that would otherwise be filtered out by implementation of the full ACL might be let through. The collector 135 may generate a delta ACL by determining identifiers on the full ACL that are not on the truncated ACL implemented by a particular router. By comparing sampled packets to the delta ACL, the collector 135 can identify (and estimate the frequency of) potential threat communications that are not being filtered by the provider edge routers 105. In examples, the collector 135 may take a mitigation action, such as to provide a warning communication to a provider edge router 105, customer network 104, threat intelligence system 110, or a combination thereof, indicating that a certain number of such threat communications are being allowed through by the provider edge router 105. In some examples, the warning communication may include a list of identifiers in the delta ACL that were identified by the collector 135. In examples, the list may be communicated through an API to the provider edge router 105, which may programmatically (e.g., automatically) add any identified identifiers from the delta ACL to the truncated ACL being implemented by the provider edge router 105 (potentially causing deletion of the lowest-rated items on the truncated ACL).

The warning communication may also include or trigger an opportunity for the network provider to upgrade to a better router capable of handling a larger ACL (or the full ACL) to filter a greater number of potential threat communications. In other examples, the network provider may be provided an opportunity to implement a larger or additional ACL on a high-level router (e.g., upstream) (e.g., router 205 in FIG. 2). For example, an upstream router may be capable of implementing the remainder of the full ACL that is not loaded onto the provider edge router 105-*a*, or by some other service (e.g., a firewall service). In some examples, the warning communication may include additional information relevant to the blocked communication (e.g., geography of the blocked IP address, the type of application that would be associated with ports or protocols being used, or the like). In some examples, the warning communication may be provided to the customer to include in other security controls that are within customer's control (e.g., customer firewalls, SIEM, etc.) with information relevant to the block the potential threat communication. In some examples, the warning communication includes an option to remove one or more lowest risk score identifiers (e.g., IP addresses) from ACL 111, or ACL 121, or both, on provider edge router 105-*a*, or 105-*b*, or both, and add, to ACL 111, or ACL 121, or both, one or more identifiers (e.g., IP addresses) associated with one or more threat communications (e.g., received threat communications) (e.g., such identifiers may be listed on a full ACL determined by threat intelligence system 110).

Collector 135 may also sample and collect/generate records of outbound communications (e.g., communications from network 104 or 124 to provider edge routers 105 to the Internet 109 or to another provider edge router 105). Collector 135 may similarly report an estimated frequency of potential threat communications that are not filtered by provider edge routers 105 in such outbound communications. Where a "permit"-type ACL is implemented, the collector 135 may also collect information about the frequency at which communications are dropped that would otherwise have been allowed to pass through the provider edge router 105 had a full ACL been implemented. Collector 135 may take a mitigation action, such as to report a warning communication to the provider edge router 105, threat intelligence system 110, or both. The warning communication may include or trigger a similar upgrade opportunity. Collector 135 may act as an alternative to the provider edge routers 105 collecting event/communication information, which would burden the provider edge routers 105. Collector 135 may report the warning communication when a provider edge router 105 is estimated to have not filtered (or to have filtered, in the case of a permit-type ACL) at least a threshold number of communications associated with identifiers in the delta ACL, for example.

Generally, customers may be able to select (e.g., through provider configuration system 102) to have services such as: (a) an upgraded router capable of longer ACLs, (b) implementation of an additional and/or larger ACL on a further-upstream and/or better capability router (e.g., router 205); (c) access to collector 135 reporting; (d) access to ACL generation and modification based on router capability via threat intelligence 110 and ACL generator 108, or a combination thereof. In examples, customers may be presented a user interface (e.g., through provider communication system 102) to allow for quick selection of such options, such as by using a web-based interface, browser-based interface, application programming interface (API) based interface, etc.

Provider edge routers 105 may block (or allow, depending on the type of ACL employed) incoming communications (e.g., from Internet 109), outgoing communications (e.g., from network 104/124), or both, when an identifier on the ACL 111 or 121, respectively, matches an identifier from the incoming or outgoing communication. In examples, the ACL comprises a list of source IP addresses and/or destination IP addresses, but other identifiers are possible and contemplated.

Figure 2:
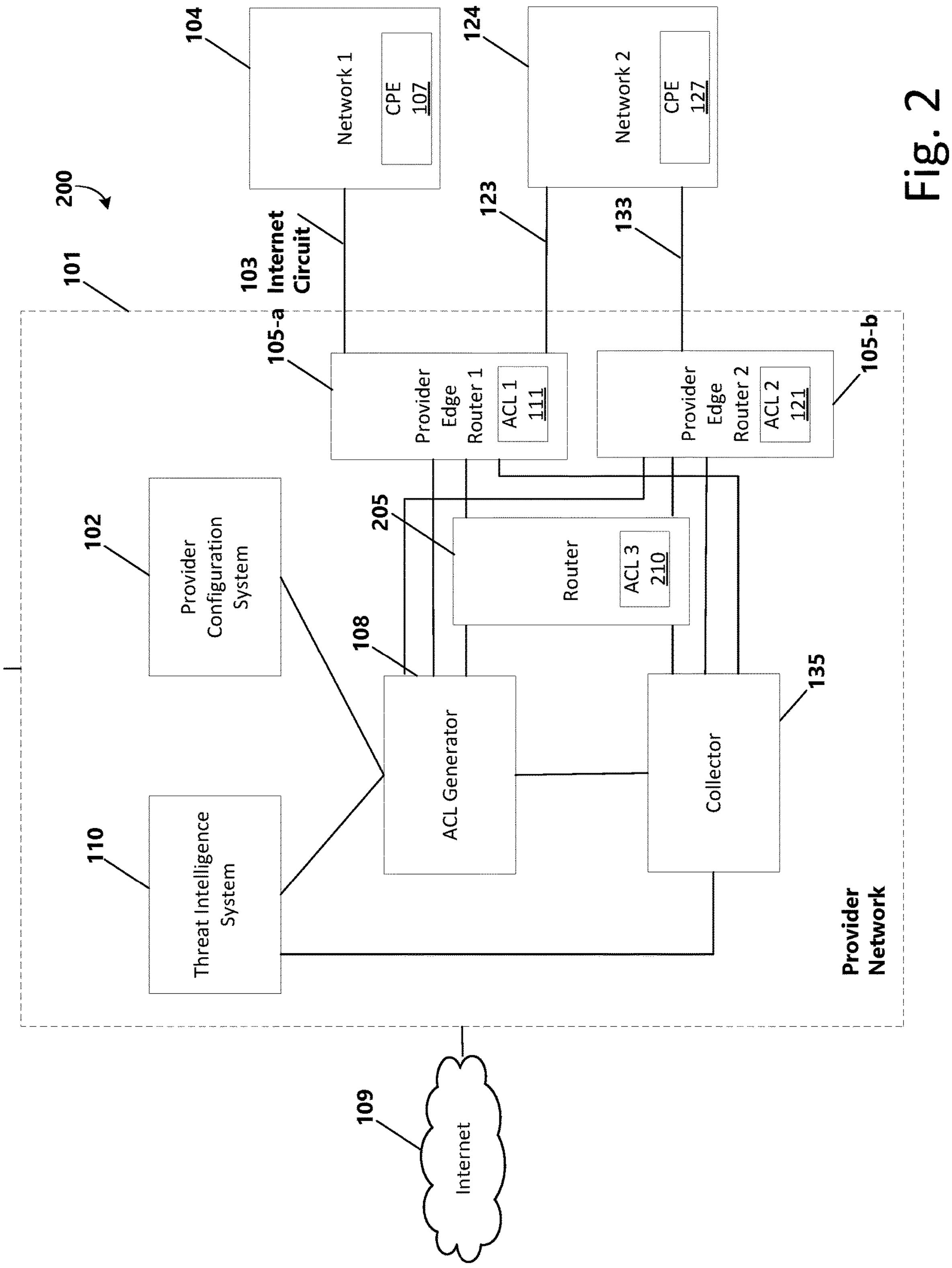
FIG. 2 is a block diagram depicting an example system according to aspects of the present application.

FIG. 2 discloses an example system 200 according to aspects of the present disclosure. FIG. 2 may include one or more similar or repeated features from FIG. 1. Similar or repeated features may be omitted for brevity.

The provider network 101 may also provide a higher-level router 205. Higher-level may refer to being further removed from the networks 104 or 124 than provider edge routers 105. Router 205 may, for example, be higher in a hierarchy of routers in the provider network and may be configured to transceive communications to and from both of provider edge routers 105-*a* and/or 105-*b*. Router 205 may generally be more powerful or more capable than provider edge routers 105. As such, router 205 may be capable of implementing a longer ACL than other provider edge routers. For example, router 205 may be capable of implementing a full, master ACL for a customer. Router 205 may communicate with one or multiple provider edge routers 105. It will be appreciated that the provider network 101 may include multiple additional levels of router hierarchy than shown in FIG. 2.

Collector 135 may receive reporting additionally or alternatively from router 205 similarly as from provider edge routers 105. Collector 135 may additionally or alternatively implement mitigation actions, such as providing a warning communication, as previously discussed. In examples, collection module 135 may report the warning communication when a provider edge router 105 or 205 is estimated to have not filtered (or to have filtered, in the case of a permit-type ACL) at least a threshold number of communications associated with identifiers in the delta ACL, for example.

ACL generator 108 may modify (e.g., reduce the length of) an ACL received from threat intelligence system 110, and provide the modified ACL to router 205. ACL generator 108 may operate similarly with router 205 as with provider edge routers 105 in this regard. For example, ACL generator 108 may modify and provide the modified ACL to provider edge routers 105, 205 depending on the capability of each router. For example, routers that are higher-capability models or have few ACLs already loaded may be capable of implementing longer ACLs from ACL generator 108. In some cases, ACL generator may provide a modified ACL, which is a subset of a received ACL from threat intelligence system 110, to provider edge router 105-*a*, and provide another modified ACL, which is a subset of the received ACL, to router 205. The ACL subsets may be different, may overlap, or may be the same depending on the configuration desired or required to prevent threat communications. For example, the ACL 210 implemented on the router 205 may be a delta ACL (e.g., the difference between a master ACL provided by one or more threat intelligence system 110 and the truncated ACL 111 or 121 implemented on provider edge router 105-*a* or 105-*b*.

In some examples, router 205 may be able to selectively filter communications using an implemented ACL 210. For example, a customer may elect to use the greater capabilities of router 205 (and the longer ACL 210 permitted thereby). ACL 210 may correspond to a length of, for example, 90,000 items (e.g., IP addresses), while ACLs 111 and 121 may correspond to lengths of, for example, 15,000 items. Communications from, for example, Internet 109 may be filtered by router 205 via ACL 210, and then filtered through, for example, provider edge router 105-*a* via ACL 111. In some examples, ACLs 111 and 121 may be implementing intra-network/intra-customer-network ACLs, where the list of identifiers relevant to intra-network endpoints (e.g., between network 104 and network 124, where both are networks controlled by the same customer) may generally be shorter, and more suitable for implementation on less capable routers such as provider edge routers 105. For example, blocked intra-network communications may include a blocked communication from network 124 to network 104 through provider edge router 105-*a*. Router 205 may implement the rest of the master ACL from threat intelligence system 110 (e.g., related to inter-network communications such as to/from Internet 109) since router 205 may be more capable of handling large ACLs than provider edge routers 105. Intra-network ACLs may be additionally or alternatively implemented on router 205 in some cases. Knowledge or information about connections between provider edge routers 105, 205, and customer networks 104, 124 (e.g., IP addresses assigned to internet circuits 103, 123, 133 or the equivalent virtual connections, or both) may be stored by ACL generator 108, collector 135, provider configuration system 102, or a combination thereof, to implement intra-network blocking on provider edge routers 105.

Router 205 may block incoming communications (e.g., from internet 109), outgoing communications (e.g., from network 104/124/provider edge routers 105), or both, when an identifier on the ACL 210 matches (or fails to match) an identifier from the incoming or outgoing communication (e.g., IP addresses).

Figure 3:
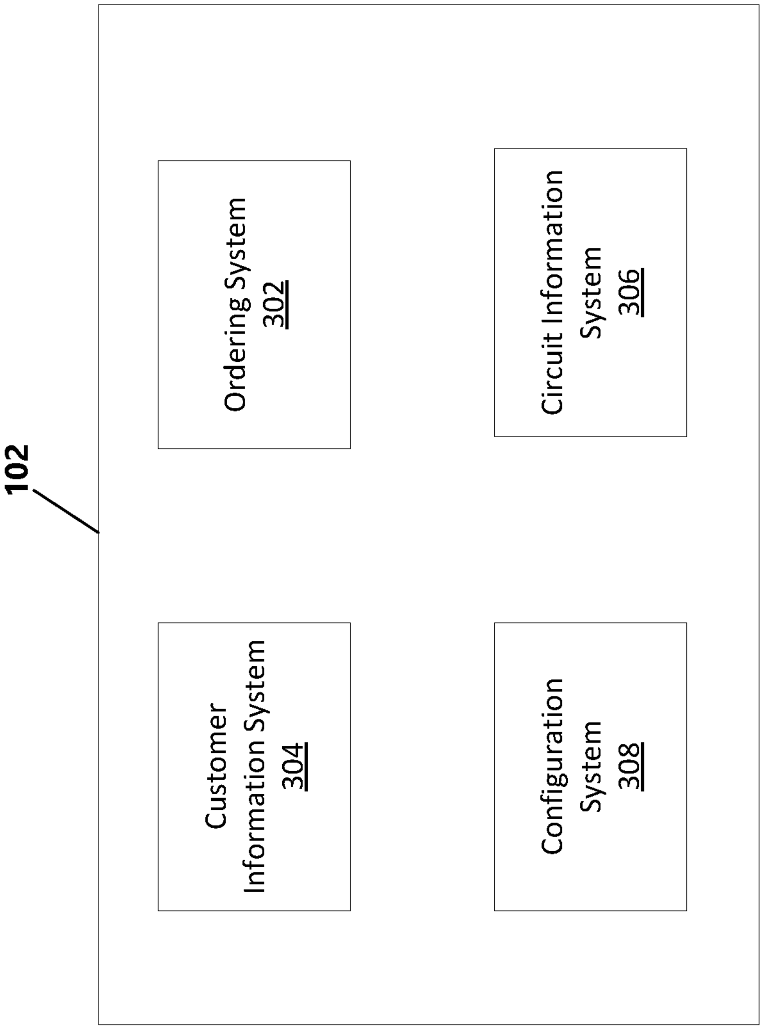
FIG. 3 is a block diagram depicting an example implementation of the provider configuration system of FIGS. 1, 2, or both.

FIG. 3 discloses a nonexclusive example of the provider configuration system 102. In the example provider configuration system 102, an ordering system 302, customer information system 304, circuit information system 306, and configuration system 308 may be provided. As discussed, any of the systems of provider configuration system 102 may be combined or distributed across one or many physical devices operatively connected by wired or wireless connections in an implementation combining software and hardware.

In examples, ordering system 302 may comprise a customer portal to permit customers of network 101 to order certain products and services. For example, the ordering system 302 may provide one or more user interface(s) for display on a device (such as customer device 106). In examples, a customer may provide (through such user interface(s)) customer information, such as customer name, physical location of the customer, whether the customer is providing its own customer premises equipment 107 or needs it to be delivered to the customer as part of an ordered service, etc. Among other things, the ordering system 302 may collect the information needed from a customer to provision an ACL service for routers, a better router that can store more complete ACLs, or a second router (or access to the second router) to store additional ACLs.

Customer information system 304 may comprise one or more data store(s) to store customer information, e.g., the customer information received through the ordering system 302. In some examples, customer information stored in customer information system 304 may be received or retrieved from other computing systems of the provider. For example, if the customer is ordering an ACL service for routers, a better router that can store more-complete ACLs, or a second router (or access to the second router) to store additional ACLs from the provider using ordering system 302, the customer may already be a customer of other products/services of the provider network, and information about the customer may already be stored in, or accessible to, customer information system 304. For example, the customer may already have the ACL service for routers, but may be ordering an additional router (e.g., router 205) or access to the router (e.g., router 205). In this instance, the ordering system may (e.g., based on a previously stored account identifier) retrieve the customer information from the customer information system 304 as part of the ordering process for the ACL service for routers, a better router that can store more-complete ACLs, or a second router to store additional ACLs.

Circuit information system 306 may, in examples, store, or be configured to retrieve from one or more other network systems, information about the network 101, including existing Internet circuits, available ports on provider edge router(s) 105, available IP address space(s) for new router assignment or new network configurations if additional router capability is added to the customer. Other network configurations such as the threat intelligence systems 110 support for the networks and routers, ACL generator 108, collector 135, etc. may be stored in circuit information system 306, for example, when a customer orders a new configuration or upgrade through ordering system 302 as previously discussed. Circuit information system 306 may be used by ordering system 302 to provide information about the nearest available provider edge router(s) 105 for a particular customer (e.g., based on the customer information received through ordering system 302). Circuit information system 306 may also cooperate with configuration system 308, as described below.

Configuration system 308 may, in examples, cause the services ordered through ordering system 302 to be provisioned within network 101. For example, when ordering system 302 receives a request from a customer for an ACL service for routers, a better router that can store more-complete ACLs, or a second router (or access to the second router) to store additional ACLs, the configuration system 308 may cooperate with the configuration information system 306 to determine the most advantageous way to configure the routers and/or additional modules. For example, configuration system 308 may, in examples, identify which routers are capable of supporting an ACL of a certain length (e.g., 15,000 items or identifiers) or which routers 105 and/or 205 should be configured to communicate with. In other examples, the configuration system 308 may determine that a new provider edge router 105 and/or router 205 should be added to network 101 (either in a new location or at an existing location) in order to accommodate additional ACL items. Configuration system 308 may also cause one or more workflows to be initiated to cause technicians to design or implement the ACL service for routers, a better router that can store more-complete ACLs, or a second router (or access to the second router) to store additional ACLs.

In examples, configuration system 308 may also cause CPE 107 and/or CPE 127 to be automatically configured. In some examples, the provider of network 101 will also provide the CPE 107 and/or CPE 127 to the customer, and the identification of the CPE (e.g., device type, MAC address, etc.) may be assigned by the configuration system 308 and stored in the customer information system 304. For example, if the provider of network 101 is also providing the CPE 107 to the customer as part of the order for the an ACL service for routers, a better router that can store more-complete ACLs, or a second router (or access to the second router) to store additional ACLs, the CPE 107 may be pre-configured to "call home" to configuration system 308 in order to receive configuration information. The configuration information provided to CPE 107 may, for example, include one or more IP address(es) for the CPE 107. The configuration information may also include one or more IP address(es) for one or more provider edge router(s) 105 that the CPE 107 will use in routing outgoing traffic from network 104 to network 101. In some examples, the configuration information is stored by customer information system 304 and/or circuit information system 306.

As discussed, using ordering system 302, the customer may order the ACL service for routers, a better router that can store longer ACLs, or a second router to store additional ACLs. The ordering system 302 may be available to automated processes through an application programming interface (API). In some examples, the ordering system 302 may also provide the customer a simple option to order the ACL service for routers, a better router that can store more-complete ACLs, or a second router to store additional ACLs. For example, in the same user interface used to order an ACL service for routers, a better router that can store more-complete ACLs, or a second router (or access to the second router) to store additional ACLs (e.g. a checkbox or other selectable option on the same web page presented to the customer, or a series of related web pages presented to the user before an order is submitted or equivalent actions performed through an API-based ordering system), the customer may be permitted to optionally add the ACL service for routers, better router upgrades, or additional routers.

Provider edge routers 105 may be able to be configured with ACLs without hardware updates. For example, routers 105 that are determined to be able to support, for example, ACLs of 15,000 items or identifiers, may be able to be configured with such ACLs after ordering system 302 is used to order the upgrade to the router.

Figure 4:
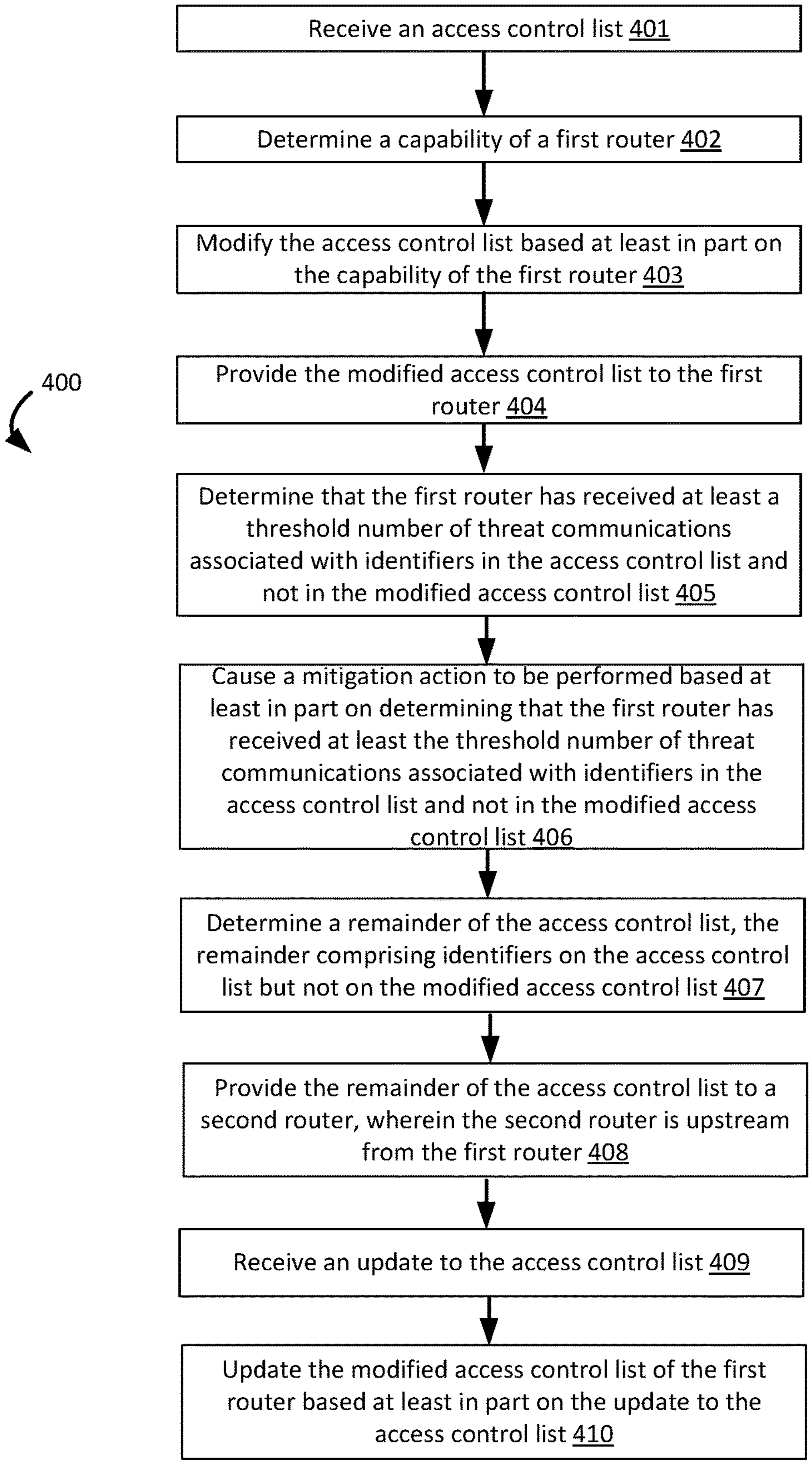
FIG. 4 is a flowchart depicting an example method according to aspects of the present application.

FIG. 4 illustrates an example method 400 in accordance with the present application. In examples, some or all of the operations of method 400 are performed by ACL generator 108. It should be understood that the sequence of operations of the method is not fixed, but can be modified, changed in order, performed differently, performed sequentially, concurrently, or simultaneously, or altered into any desired sequence, as recognized by a person of skill in the art. In some examples, certain operations depicted in the method 400 may be omitted, and in certain examples, other operations may be added.

At operation 401, the method may include receiving an access control list. For example, ACL generator 108 may receive an ACL from threat intelligence system 110.

At operation 402, the method may include determining a capability of a first router. In some examples, the capability of the first router is based on an identifier of the first router, one or more other access control lists stored on the first router, or a combination thereof. For example, ACL generator, provider configuration system, or both, may determine the capability of provider edge routers 105, 205, or both.

At operation 403, the method may include modifying the access control list based at least in part on the capability of the first router. For example, an ACL generator may modify the ACL from threat intelligence system 110 based on the capability of provider edge routers 105, 205, or both. In some examples, modifying the access control list includes reducing a number of items on the access control list based on identifying that the first router is not capable of storing the full access control list. In some examples, the modified access control list includes intra-network identifiers and the remainder of the access control list includes inter-network identifiers.

At operation 404, the method may include providing the modified access control list to the first router. For example, ACL generator 108 may provide the modified ACL to provider edge router 105-*a*, 105-*b*, 205, or a combination thereof. That is, ACL generator may be capable of providing a modified ACL to one provider edge router or multiple provider edge routers. The modified ACLs may include ACL 111, 121, or 210, respectively. Provider edge routers 105 and 205 may be capable of implementing complete (e.g., non-modified) ACLs in some cases (e.g., non modified with respect to the ACL provided from threat intelligence system 110). In some cases, ACL generator may generate different modified ACLs and provide different modified ACLs to different provider edge routers. In some examples, the method may include updating the modified access control list of the first router based on receiving a new access control list. In some examples, the method may include determining that the first router has received at least a threshold number of threat communications associated with identifiers in the access control list and not in the modified access control list, and reporting a warning communication based on determining that the first router has received at least the threshold number of threat communications associated with identifiers in the access control list and not in the modified access control list. For example, a warning communication may be provided to the customer and/or to one or more elements of the provider network indicating that the customer is not being protected from certain threat communications and/or that certain communications are being undesirably dropped. In another example, the mitigation action may include automatically or programmatically installing a larger ACL on a different router 105 (e.g., 105-*b*) where traffic may be automatically routed to the different router 105 (e.g., 105-*b*) instead of the first router 105 (e.g., provider edge router 105-*a*). Additionally or alternatively, an additional part of the original ACL may be automatically or programmatically added to an ACL at an upstream router (e.g., router 205), or another router (e.g., the first or second router 105 (e.g., 105-*a* or 105-*b*)).

At operation 407, the method may include determining a remainder of the access control list, the remainder comprising identifiers on the access control list but not on the modified access control list.

At operation 408, the method may include providing the remainder of the access control list to a second router, wherein the second router is upstream from the first router.

At operation 409, the method may include receiving an update to the access control list.

At operation 410, the method may include updating the modified access control list of the first router based at least in part on the update to the access control list. Such an update may trigger the steps at operation 401 through operation 410 to repeat to implement the modified access control lists.

In some examples, the first router may be configured to block (or allow) an incoming communication based on the incoming communication comprising an identifier that is listed on the modified access control list. For example, provider edge router 105-*a*, 105-*b*, 205, or a combination thereof, may be configured to block an incoming communication (e.g., from internet 109) if the incoming communication comprises a threat communication (e.g., an IP in the communication matches with an IP on the ACL 111, 121, or 210 respectively). In some examples, the first router is configured to block an outgoing communication based on the outgoing communication including an identifier that is listed on the modified access control list.

Figure 5:
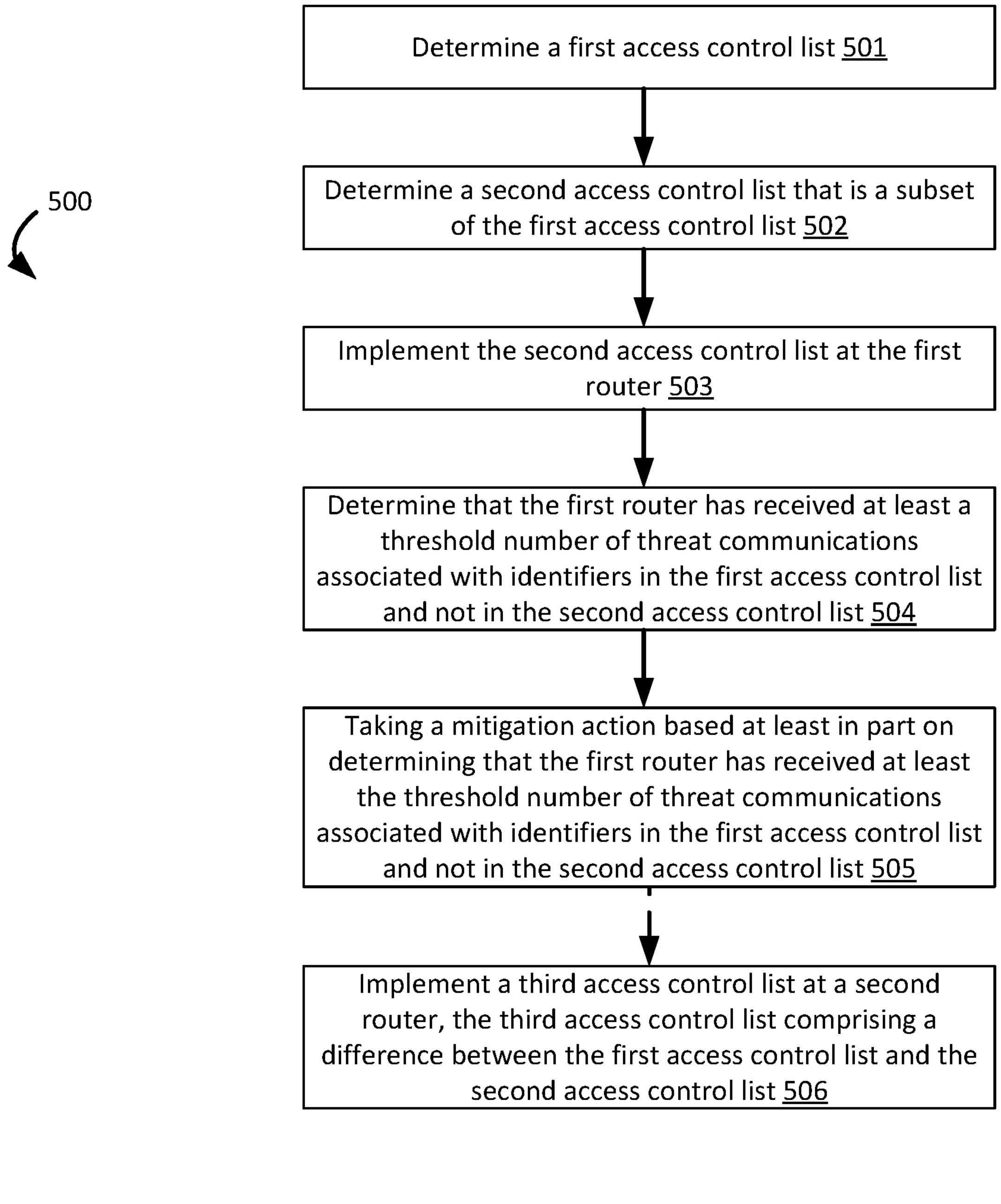
FIG. 5 is a flowchart depicting an example method according to aspects of the present application.

FIG. 5 illustrates an example method 500 in accordance with the present application. In examples, some or all of the operations of method 500 are performed by ACL generator 108, collector 135, or both. It should be understood that the sequence of operations of the method is not fixed, but can be modified, changed in order, performed differently, performed sequentially, concurrently, or simultaneously, or altered into any desired sequence, as recognized by a person of skill in the art. In some examples, certain operations depicted in the method 500 may be omitted, and in certain examples, other operations may be added.

At operation 501, the method may include determining a first access control list. For example, threat intelligence system 110, ACL generator 108, collector 135, or a combination thereof, may determine a first ACL. The first ACL may be provided from threat intelligence system 110. In some examples, threat intelligence system 110 may be continuously updated as new threats are discovered causing operation 501 to be initiated as changes above defined thresholds occur (e.g., time-based, number of changes, critical nature of changes, etc.).

At operation 502, the method may include determining a second access control list that is a subset of the first access control list. For example, ACL generator 108, collector 135, or a combination thereof, may determine a modified ACL, where the modified ACL is a subset of the first ACL (e.g., the first ACL may be provided from threat intelligence system 110).

At operation 503, the method may include implementing the second access control list at the first router. For example, ACL generator 108 may implement the modified ACL at a provider edge router 105, 205, or a combination thereof, as ACL 111, 121, 210 respectively. In some examples, implementing the second access control list at the first router is based on a capability of the first router.

At operation 504, the method may include determining that the first router has received at least a threshold number of threat communications associated with identifiers in the first access control list and not in the second access control list. For example, collector 135 may determine that provider edge router 105-*a*, 105-*b*, or 205 has received a threshold number of threat communications with identifiers (e.g., IP addresses) in the first ACL (e.g., the large ACL from threat intelligence system 110) and not in the second ACL (e.g., the modified ACL implemented on the provider edge router (e.g., ACL 111, 121, 210)). In some examples, the identifiers include internet protocol addresses, port numbers, protocol types, or a combination thereof.

At operation 505, the method may include taking a mitigation action based at least in part on determining that the first router has received at least the threshold number of threat communications associated with identifiers in the first access control list and not in the second access control list. In some examples, taking the mitigation action comprises reporting a warning communication. In some examples, the warning communication includes an option to upgrade a security setting. For example, a customer may opt to gain access to router 205 to host a larger ACL to block more threat communications. In some examples, the warning communication includes an option to remove one or more lowest risk score identifiers from the second access control list and add, to the second access control list, the identifiers associated with the received threat communications in the first access control list and not in the second access control list.

At operation 506, the method may include implementing a third access control list at a second router, the third access control list comprising a difference between the first access control list and the second access control list.

Figure 6:
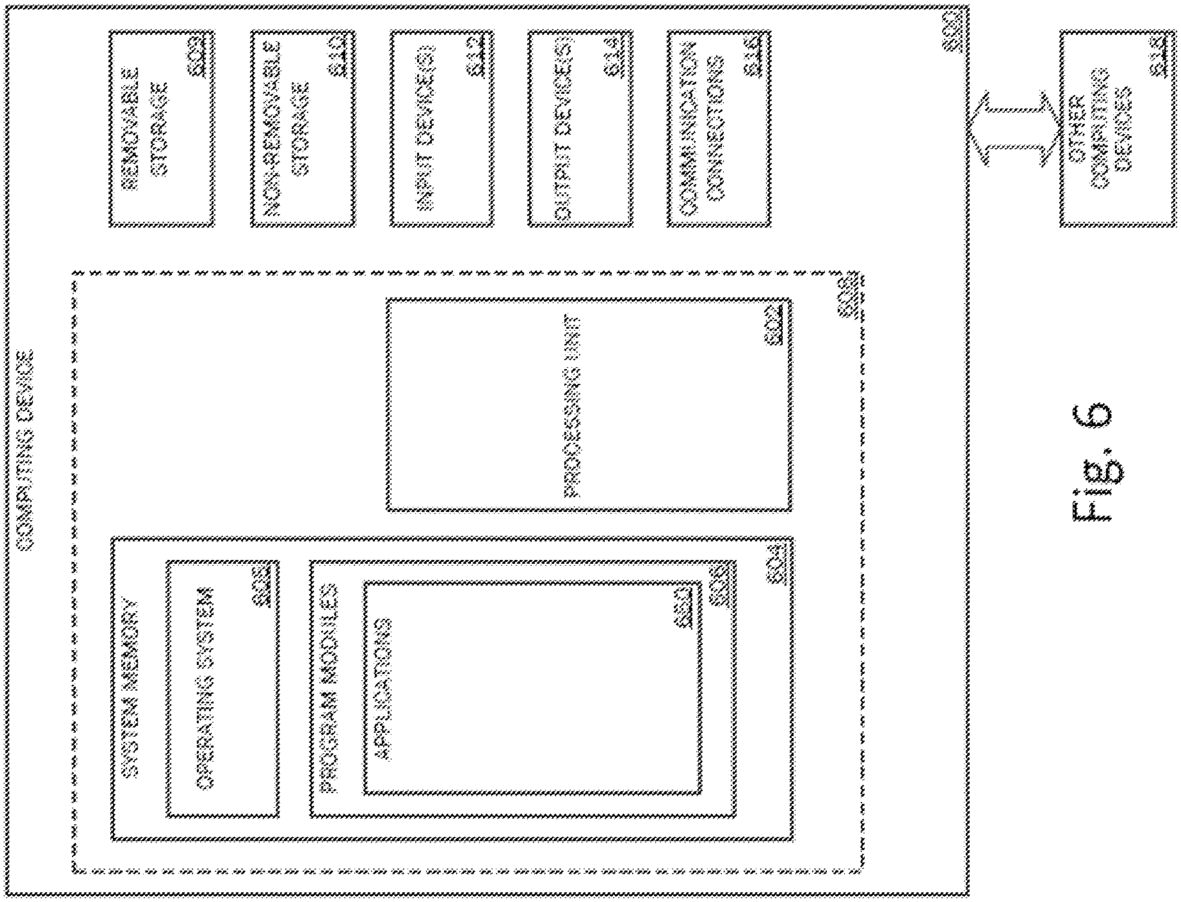
FIG. 6 is a block diagram depicting an example computing environment in which systems and methods of the present application may be implemented.

FIG. 6 is a block diagram illustrating physical components (i.e., hardware) of a computing device 600 with which examples of the present disclosure may be practiced. The computing device components described below may be suitable for a customer device implanting one or more of the provider configuration system 102, the ACL generator 108, collector 135, routers 105, 205, threat intelligence system 110, CPE 107, 127, or other components of FIGS. 1-3. In a basic configuration, the computing device 600 may include at least one processing unit 602 and a system memory 604. The processing unit(s) (e.g., processors) may be referred to as a processing system. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 650 to implement one or more of the systems described above with respect to FIGS. 1-3.

The operating system 605, for example, may be suitable for controlling the operation of the computing device 600. Furthermore, aspects of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, solid state drives, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, but not limited to, one or more of the operations of the methods illustrated in FIGS. 4-5. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 600 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:

receiving an access control list;

determining a capability of a first router;

modifying the access control list based at least in part on the capability of the first router;

providing the modified access control list to the first router, wherein the first router updates a first access control list based on the modified access control list;

determining a remainder of the access control list, the remainder comprising identifiers on the access control list but not on the modified access control list; and providing the remainder of the access control list to a second router, wherein the second router is upstream from the first router, and wherein the second router updates a second access control list based on the remainder of the access control list.

2. The method of claim 1, wherein modifying the access control list comprises reducing a number of items on the access control list based at least in part on identifying a maximum capacity of the first router for the access control list.

3. The method of claim 1, wherein the capability of the first router is based at least in part on an identifier of the first router, one or more other access control lists stored on the first router, or a combination thereof.

4. The method of claim 1, further comprising:

receiving an update to the access control list; and updating the modified access control list of the first router based at least in part on the update to the access control list.

5. The method of claim 1, further comprising:

determining that the first router has received at least a threshold number of threat communications associated with identifiers in the access control list and not in the modified access control list; and reporting a warning communication based at least in part on determining that the first router has received at least the threshold number of threat communications associated with identifiers in the access control list and not in the modified access control list.

6. The method of claim 1, wherein the modified access control list comprises intra-network identifiers and the remainder of the access control list comprises inter-network identifiers.

7. The method of claim 1, wherein the first router is configured to block an incoming communication based at least in part on the incoming communication comprising an identifier that is listed on the modified access control list.

8. The method of claim 1, wherein the first router is configured to block an outgoing communication based at least in part on the outgoing communication comprising an identifier that is listed on the modified access control list.

9. A system, comprising:

a processor; and a memory operatively connected to the processor and storing instructions that, when executed by the processor, cause the system to perform a method, the method comprising:

receiving an access control list;

determining a capability of a first router;

modifying the access control list based at least in part on the capability of the first router;

providing the modified access control list to the router, wherein the first router updates a first access control list based on the modified access control list;

determining a remainder of the access control list, the remainder comprising identifiers on the access control list but not on the modified access control list; and providing the remainder of the access control list to a second router, wherein the second router is upstream from the first router, and wherein the second router updates a second access control list based on the remainder of the access control list.

10. The system of claim 9, wherein modifying the access control list comprises reducing a number of items on the access control list based at least in part on identifying that the first router is not capable of storing the full access control list.

11. The system of claim 9, the method further comprising:

determining that the first router has received at least a threshold number of threat communications associated with identifiers in the access control list and not in the modified access control list; and reporting a warning communication based at least in part on determining that the first router has received at least the threshold number of threat communications associated with identifiers in the access control list and not in the modified access control list.

* * * * *